Sept. 17, 1940.                C. A. BAUMGARDNER                 2,214,873
       AUTOMATIC BRAKE FOR THE MAIN SHAFT OF A TYPOGRAPHICAL MACHINE
                        Filed Aug. 19, 1938         2 Sheets-Sheet 1
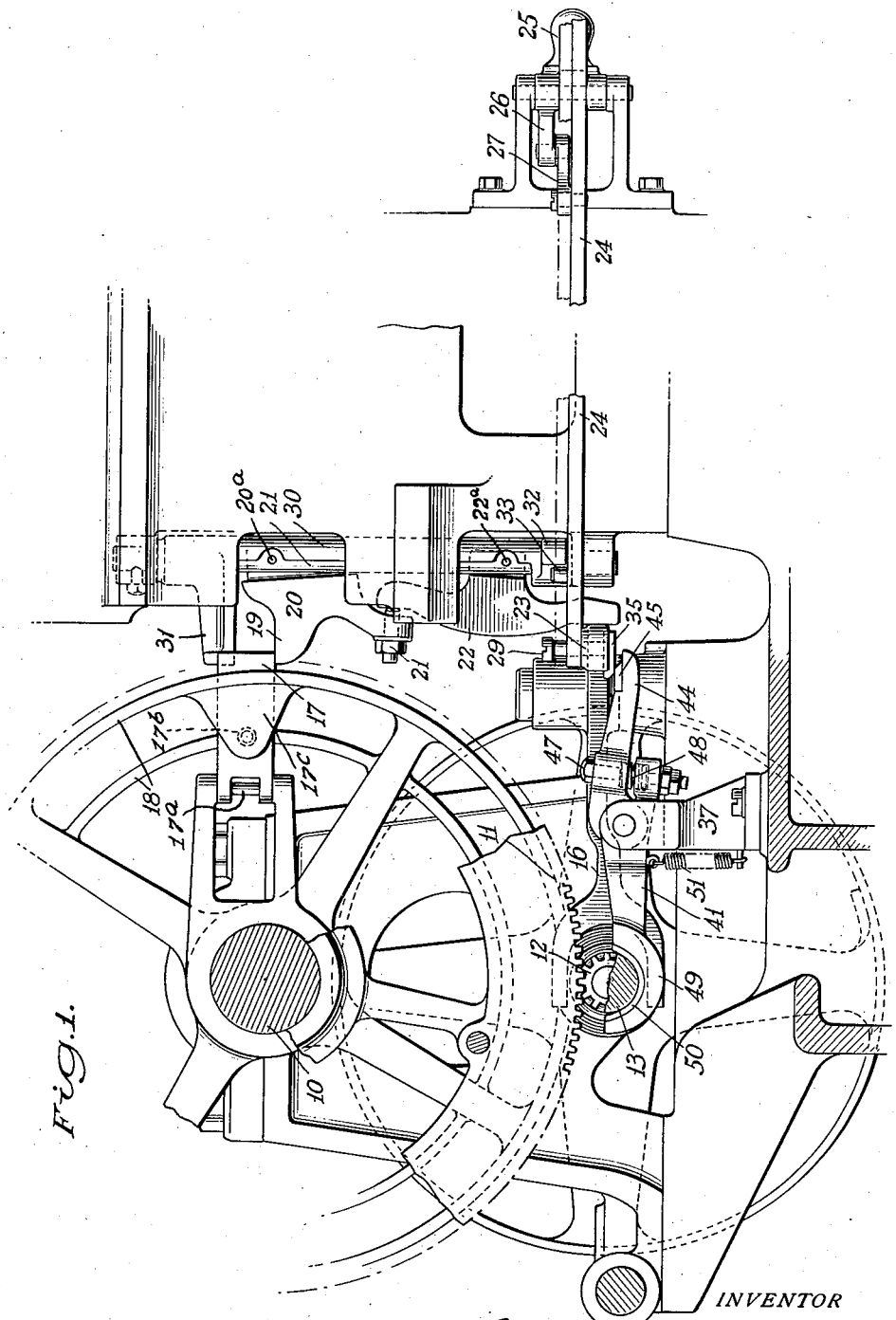
INVENTOR
BY Craven A. Baumgardner
Morrison, Kennedy & Campbell
ATTORNEYS

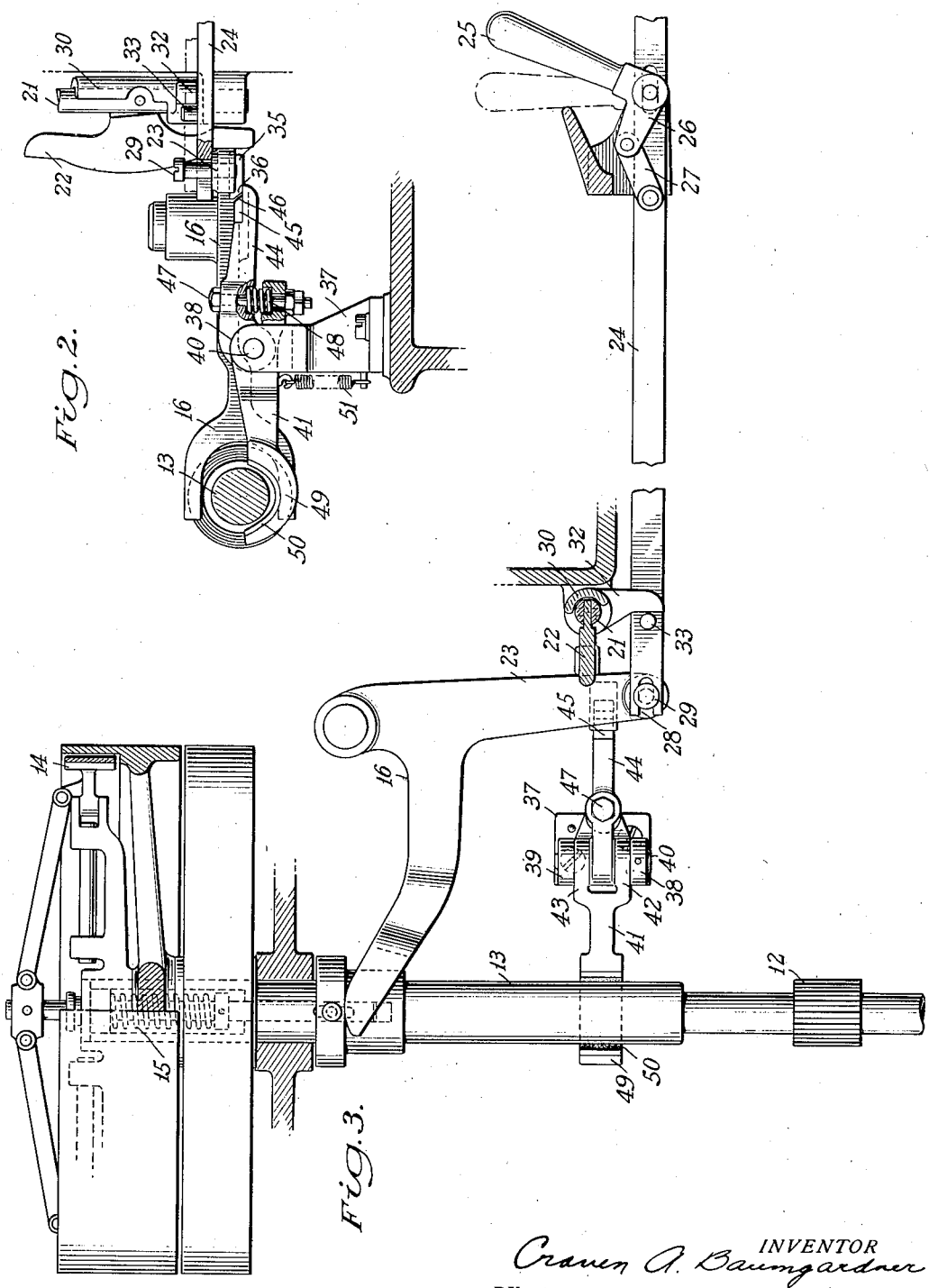

Patented Sept. 17, 1940

2,214,873

UNITED STATES PATENT OFFICE 2,214,873

AUTOMATIC BRAKE FOR THE MAIN SHAFT OF A TYPOGRAPHICAL MACHINE

Craven A. Baumgardner, Huntington, W. Va., assignor to Mergenthaler Linotype Company, a corporation of New York Application August 19, 1938, Serial No. 225,706

9 Claims. (Cl. 192—144)

This invention relates to typographical machines of the general organization represented in United States Letters Patent to O. Mergenthaler No. 436,532, wherein circulating matrices are released from a storage magazine in the order in which their characters are to appear in print and then assembled in line, the composed line transferred to the face of a slotted mold, the mold filled with molten metal to form a slug or type bar against the matrices which produce the type characters thereon, and the matrices thereafter returned through a distributing mechanism to the magazine from which they started.

In such machines, the various operations which take place during a cycle of operation are controlled in proper sequence by a plurality of cams fast to a shaft which is driven by a drive shaft through a clutch normally maintained operative by a spring but adapted to be rendered inoperative in response to the rocking of a bell crank lever pivoted to the main frame of the machine. In the normal operation of the machine, the rocking of the bell crank lever to render the clutch inoperative is effected automatically at the end of a cycle of operation by the engagement of a trip dog carried by one of the cams with an interposed stop lever, but in the event it is desired to stop the machine during a cycle of operation, as for example to prevent damage in case of trouble, the rocking of the lever may be effected by the movement of a fore-and-aft lever provided for the purpose.

While in general the above described arrangement for stopping the machine is satisfactory, it is open to the objection that the drive shaft, due to momentum, tends to continue its rotation for a short interval after the clutch is disengaged. When the clutch is disengaged automatically at the end of a cycle of operation, this tendency of the shaft to continue its rotation is objectionable in that it creates a chattering action between the trip dog and the stop lever and so subjects these parts to undue wear. When the clutch is disengaged during a cycle of operation, this tendency of the shaft to continue its rotation is more objectionable, particularly when the clutch is disengaged to prevent damage to the parts in case of trouble, since in such cases the damage is apt to occur between the time the clutch is disengaged and the time the shaft and the parts driven thereby finally come to rest.

The present invention is intended to overcome the above and other objections and contemplates means for arresting the rotation of the drive shaft of the machine in a final desired position when the clutch is disengaged. To this end, the machine is provided with a brake which is carried into and out of frictional engagement with the drive shaft as the bell crank lever is rocked to disengage the clutch and thereafter returned to its normal position.

For a clear understanding of the invention, reference may be made to the accompanying drawings wherein it is shown in preferred form and by way of example. It will be obvious, however, that many changes and alterations may be made therein and in its mode of adaptation without departing from its spirit, and it is to be understood that the invention is not limited to any specific form or embodiment except insofar as such limitations are specified in the appended claims.

Referring to the drawings:

Fig. 1 is a side elevation, partly in section, of the clutch actuating mechanism constructed in accordance with the present invention;

Fig. 2 is a side elevation, partly in section, of the brake mechanism employed for stopping the rotation of the drive shaft when the clutch is disengaged; and Fig. 3 is a top plan view showing the main drive shaft, the clutch for driving the shaft, the mechanism employed for rendering the clutch operative and inoperative, the brake for arresting the rotation of the shaft when the clutch is disengaged, and the mechanism employed in rendering the brake operative.

In the drawings, 10 represents the main cam shaft of the machine which, as usual, is provided with a large gear wheel 11 meshing with a small pinion 12 on a drive shaft 13. The latter shaft is equipped with the customary clutch 14 (see Rogers Patent No. 661,386) which is engaged by a spring 15 and disengaged by a bell crank lever 16 pivoted in the main frame of the machine.

In the normal operation of the machine, the rocking of the lever 16 to disengage the clutch 14 is effected automatically at the end of a cycle of operation in a well-known manner by the engagement of a laterally movable spring-pressed trip dog 17, carried by a double-rim face-cam wheel 18 (whose cam surfaces are formed on the side opposite that shown in the drawing), fast to the main shaft 10, with a shoulder 19 formed on the upper end of a stop lever 20 pivotally mounted at 20a in a slot cut in a vertically disposed, fixed, rod 21 supported in the main frame of the machine. The trip dog 17 is pivoted to the cam wheel 18 at 17a and is normally held in the path of the stop lever 20 by a compression spring 17b interposed between the trip dog and a bracket 17c carried by the cam wheel. The lower end of the stop lever 20 is provided with an adjusting screw 21 which engages the upper end of a coacting stop lever 22 which is also pivotally mounted at 22a in a slot cut in the fixed rod 21, and the lower end of the co-acting lever 22 projects downwardly in front of the outer end of the lateral arm 23 of the bell crank lever 16. By this arrangement, when the trip dog 17 engages the shoulder 19, the stop levers 20 and 22 are rocked about their respective pivots and in turn rock the bell crank lever 16 in the proper direction to disengage the clutch 14, all as well understood in the art.

When the machine is started automatically at the beginning of a cycle of operation, the trip dog 17 is swung laterally from above the shoulder 19 on the stop lever 20 in response to the release of the line delivery carriage (not shown), but since this has no bearing on the present invention, a description of the operating connecttions is not deemed necessary (but see, if desired, the Converse Patent No. 1,129,851, dated March 2, 1915), although it may be stated that when the trip dog 17 is thus moved laterally the spring 15 acts to engage the clutch 14 and restore the bell crank lever 16 to its normal at-rest position. It may also be noted and as fully explained in the Converse patent), after the operation of the machine has thus been inaugurated, the trip dog 17 is instantly restored by its spring into the path of the stop lever 20 so that when the cam shaft 10 makes one complete rotation, the trip dog will, as above stated, reengage the stop lever 20 and disengage the clutch to bring the cam shaft to rest.

When the machine is started manually, there is employed for the purpose a fore-and-aft rod 24, whose forward end is connected to a hand lever 25 at the front of the machine by a toggle joint consisting of a rearwardly extending arm 26 and a link 27, and whose rear end is provided with an open ended slot 28 through which projects a stud 29 rising from the outer end of the lateral arm 23 of the bell crank lever 16. A vertical sleeve 30, mounted to turn upon the vertical fixed rod 21, is provided near its upper end with a radially extending arm 31 arranged in position to engage the trip dog 17, and at its lower end with an arm 32 which extends into the path of a pin 33 located on the fore-and-aft rod 24. When the control handle 25 is moved forwardly (as in Fig. 3), the pin 33 engages the arm 32 and so rotates the sleeve 30 about the fixed rod 21. As the sleeve 30 rotates, it carries the arm 31 against the trip dog 17 and moves it laterally from above the shoulder 19, thus permitting the spring 15 to engage the clutch 14 and restore the bell crank lever 16 to its normal position.

As is well known, the fore-and-aft rod 24 may also be operated to stop the machine during a cycle of operation and thereafter to restart it to complete the cycle. Thus, when the rod is moved backwardly or to the left in Figs. 1 and 3 by the hand lever 25, the pin 29 carried by the lateral arm 23 of the bell crank lever 16 is engaged by the closed end of the slot 28 and the lever rocked in the proper direction to force the clutch open against the action of the spring 15. Then when the fore-and-aft rod 24 is thereafter moved forwardly by the hand lever 25, the spring 15 acts to re-close the clutch.

Coming now to the present invention, means are provided for arresting the rotation of the drive shaft 13 in a final desired position whenever the clutch 14 is disengaged either during or at the end of a cycle of operation. To this end, the bell crank lever 16, on its lower side and at the outer end of its lateral arm 23, is provided with a shoe 35 having a beveled rear face 36. A bracket 37, secured to the main frame of the machine, is provided at its upper end with a pair of spaced lugs 38 and 39 in which the opposite ends of a short rod 40 are supported. A rocker arm 41 is intermediately pivoted to the rod 40 by means of a pair of hub portions 42 and 43. The rear end of a co-acting lever 44 is also pivotally mounted on the rod 40 between the hub portions 42 and 43, and the forward end of said lever is recessed to provide a seat for a shoe 45 having a beveled front face 46. Between its ends, the co-acting lever 44 is yieldingly connected to the front end of the rocker arm 41 by means of a bolt 47 which passes through alined apertures of the two and a spring 48 which is positioned about the bolt 47 with its ends seated in suitable recesses formed in the opposed faces of the lever and the rocker arm. The rear end of the rocker arm carries a semi-circular cradle 49 which is provided with a brake lining 50 adapted to frictionally engage the underside of the drive shaft 13 when pressed upwardly thereagainst. Normally, the brake lining 50 is held out of engagement with the shaft 13 by means of a spring 51, one end of which is secured to the rocker arm 41 and the other end of which is secured to the bracket 37.

By the foregoing arrangement, when the clutch 14 is engaged and the machine is in operation, with the bell crank lever 16 in its normal position, the beveled face 36 of the shoe 35 is positioned immediately in front of the beveled face 46 of the shoe 45 on the co-acting lever 44 (see Fig. 2). When, however, the fore-and-aft rod 24 is moved backwardly either during or at the end of a cycle of operation in the manner before described, the shoe 35 moves over the shoe 45 and so depresses the front end of the co-acting lever 44 (see Fig. 1). As the front end of the co-acting lever 44 is thus depressed, the rear end of the rocker arm 41 is raised against the action of the spring 51 and the brake lining 50 is carried into frictional engagement with the drive shaft 13, bringing it to rest in a final desired position simultaneously with the disengagement of the clutch 14. When later the fore-and-aft rod 24 is moved forwardly, either at the beginning or during a cycle of operation and the bell crank lever 16 restored to its normal position by the engagement of the clutch 14 under the influence of the spring 15, the shoe 35 is moved clear of the shoe 45 and the spring 51 acts instantly to carry the brake lining 50 out of engagement with the drive shaft 13.

If the arrangement of parts be such that a slight rearward movement of the beveled face 36 of the shoe 35 over the beveled face 46 of the shoe 45 carries the brake lining 50 into engagement with the shaft 13, the spring 48 will yield and allow the full travel of the shoe 35 above the shoe 45 without causing damage to the parts.

Having thus described my invention, what I claim is:

1. In or for a typographical machine, the combination of a main shaft, a clutch for driving said shaft, a rotary element fast to said shaft, a trip dog carried by said cam, a stop lever, a brake for arresting the rotation of said shaft, a bell crank lever actuated by the engagement of said trip dog with said stop lever at the end of a cycle of operation, and means responsive to the actuation of said lever for simultaneously disengaging said clutch and applying said brake.

2. In or for a typographical machine, the combination of a main shaft, a clutch for driving said shaft, a rotary element fast to said shaft, a trip dog carried by said rotary element, a stop lever, a brake for arresting the rotation of said shaft, a bell crank lever actuated by the engagement of said trip dog with said stop lever at the end of a cycle of operation, manual devices for actuating said bell crank lever independently of said trip dog during a cycle of operation, and means responsive to the actuation of said lever for simultaneously disengaging said clutch and applying said brake.

3. In or for a typographical machine, the combination of a main shaft, a drive shaft geared thereto, a clutch for said drive shaft, a brake for arresting the rotation of said drive shaft, a bell crank lever operable to disengage the clutch and simultaneously apply the brake, a rotary element fast to the main shaft and equipped with a trip dog, a stop lever arranged to be engaged and actuated by said trip dog at the end of a cycle of operation of the main shaft, and operative connections whereby the actuation of said stop lever will effect the clutch disengaging and brake applying operations of the bell crank lever.

4. In or for a typographical machine, the combination of a main shaft, a drive shaft geared thereto, a clutch for said drive shaft, a brake for arresting the rotation of said drive shaft, a bell crank lever operable to disengage the clutch and simultaneously apply the brake, a rotary element fast to the main shaft and equipped with a trip dog, a stop lever arranged to be engaged and actuated by said trip dog at the end of a cycle of operation of the main shaft, operative connections whereby the actuation of said stop lever will effect the clutch disengaging and brake applying operations of the bell crank lever, and a fore-and-aft rod operable manually during a cycle of operation of the main shaft for effecting the clutch disengaging and brake applying operations of the bell crank lever independently of the trip dog.

5. In or for a typographical machine, the combination of a main shaft, a drive shaft geared thereto, a clutch for said drive shaft, a brake for arresting the rotation of the main shaft, and automatic means operable from the main shaft at the end of a cycle of operation thereof for disengaging said clutch and simultaneously applying said brake.

6. In or for a typographical machine, the combination of a main shaft, a drive shaft geared thereto, a clutch for said drive shaft, a brake for arresting the rotation of the main shaft, automatic means operable from the main shaft at the end of a cycle of operation thereof for disengaging said clutch and simultaneously applying said brake, and means operable manually independently of the main shaft and during a cycle of operation thereof for also disengaging said clutch and simultaneously applying said brake.

7. In or for a typographical machine, the combination of a main shaft, a drive shaft geared thereto, a clutch for said drive shaft, a brake for arresting the rotation of the main shaft, and a bell crank lever, operable automatically from the main shaft at the end of a cycle of operation thereof as well as manually independently of the main shaft during a cycle of operation thereof, for disengaging said clutch and simultaneously applying said brake.

8. A combination according to claim 7, wherein the brake is disposed in juxtaposition to the bell crank lever, with an actuating arm arranged to be engaged directly by one arm of said bell crank lever.

9. A combination according to claim 7, wherein an actuating arm for the brake and one arm of the bell crank lever are provided with cooperating beveled shoes.

CRAVEN A. BAUMGARDNER.